United States Patent [19]

Herzberger

[11] Patent Number: 5,177,742

[45] Date of Patent: Jan. 5, 1993

[54] DEMULTIPLEXER FOR A SERIAL AND ISOCHRONOUS MULTIPLEX SIGNAL

[75] Inventor: Achim Herzberger, Nuremberg, Fed. Rep. of Germany

[73] Assignee: U.S. Philips Corporation, New York, N.Y.

[21] Appl. No.: 759,696

[22] Filed: Sep. 9, 1991

Related U.S. Application Data

[63] Continuation of Ser. No. 489,405, Mar. 5, 1990, abandoned.

[30] Foreign Application Priority Data

Mar. 4, 1989 [DE] Fed. Rep. of Germany ....... 3907050

[51] Int. Cl.⁵ .............................................. H04J 3/04
[52] U.S. Cl. .................................. 370/112; 371/37.1; 371/40.1
[58] Field of Search ............ 370/112, 84, 105.1, 370/105.2; 307/243, 244; 328/153, 154; 371/37.1, 40.1, 49.1

[56] References Cited

U.S. PATENT DOCUMENTS

| | | | |
|---|---|---|---|
| 4,485,470 | 11/1984 | Reali | 370/112 |
| 4,727,541 | 2/1988 | Mori et al. | 370/112 |
| 4,731,783 | 3/1988 | Fontanes | 370/84 |
| 4,750,172 | 6/1988 | Hornung et al. | 370/112 |
| 4,805,165 | 2/1989 | Kawamura et al. | 370/112 |
| 4,914,655 | 4/1990 | Johannes et al. | 370/112 |

FOREIGN PATENT DOCUMENTS

| | | |
|---|---|---|
| 0101056 | 2/1984 | European Pat. Off. |
| 0103163 | 3/1984 | European Pat. Off. |

Primary Examiner—Douglas W. Olms
Assistant Examiner—Dang Ton
Attorney, Agent, or Firm—Anne E. Barschall

[57] ABSTRACT

The described demultiplexer is intended for a serial and isochronous multiplex signal consisting of Q isochronous tributary signals interleaved bock-by-block, each block containing K bits. An associated multiplexer is also described. In order to keep the required memory capacity in a demultiplexer as small as possible, a write/read memory (5) is utilized, into which the bits of the multiplex signal are cyclically written and from which, simultaneously, the bits of the tributary signals are read out cyclically. A write/read control (4) coordinates the writing and reading processes in a manner such that no collisions occur. In an exemplary embodiment the bits of the multiplex signal are written into the write/read memory (5) bit-by-bit by means of a serial-to-parallel converter (2). Reading is effected bit-by-bit while utilizing read logics (81, 82, 83, 84) which are also controlled by the write/read control (4) via addresses. At the output (91, 92, 93, 94) of each of these read logics (81, 82, 83, 84) the tributary signals are available in a serial form.

3 Claims, 2 Drawing Sheets

DEMULTIPLEXER FOR A SERIAL AND ISOCHRONOUS MULTIPLEX SIGNAL

This is a continuation of application Ser. No. 07/489,405, filed on Mar. 5, 1990 now abandoned.

The invention relates to a demultiplexer for a serial and isochronous multiplex signal consisting of Q isochronous tributary signals interleaved block-by-block, each block containing K bits. The invention likewise relates to an associated multiplexer.

Such multiplexers and demultiplexers are necessary, for example, for building and breaking up digital signal hierarchies in accordance with the CCITT Draft Recommendations G 707, G 708 and G 709.

For breaking up a multiplex signal into, for example, four tributary signals it seems obvious to utilize a demultiplexer in which four consecutive blocks of the multiplex signal are written into a shift register of corresponding length. Subsequently, each of the four blocks, each of which belongs to a different tributary signal, is transferred in parallel form to a separate shift register and read out serially from this shift register. With these and all further considerations as to demultiplexers and multiplexers respectively, the problem of synchronization is assumed to have been solved ( compare e.g. European Patent No. EP 0 103 163 B1 and European Patent No. EP 0 101 056 B1).

If, the multiplex signal is a synchronous transport module STM-16 consisting of four synchronous transport modules STM-4 ( see in this context the above-mentioned Draft Recommendations), the demultiplexer that has just been described would need shift registers having memory locations of a total of 32 bytes.

Since a multiplex signal having an STM-16 frame is transmitted at a bit rate of 2.488.32 Mbit/s—and thus, each tributary signal at one fourth thereof—for such signals special attention has to be paid to a small storage capacity in a multiplexer or a demultiplexer because otherwise considerable problems as to heat discharge will occur which heat is caused by the electric power dissipation. The requirement as to small storage capacity is also important when the arrangement is to be realised as an integrated circuit in ECL-technology so that the least possible space is taken up.

It is an object of the invention to provide a demultiplexer and an associated multiplexer, the required storage capacity of which is reduced considerably with respect to the solution mentioned above.

This object is achieved in a demultiplexer by means of the characteristic features claimed in claim 1. The characteristic features of a multiplexer are claimed in claim 2. An embodiment of the multiplexer is claimed in claim 3.

The circuit arrangements according to the invention are advantageous in that, despite the relatively small required storage capacity, they can be driven by means of clocks that can be derived from a single clock by simple frequency division.

The invention will be further explained by means of an exemplary embodiment and with reference to the accompanying drawings in which.

Figure 1:
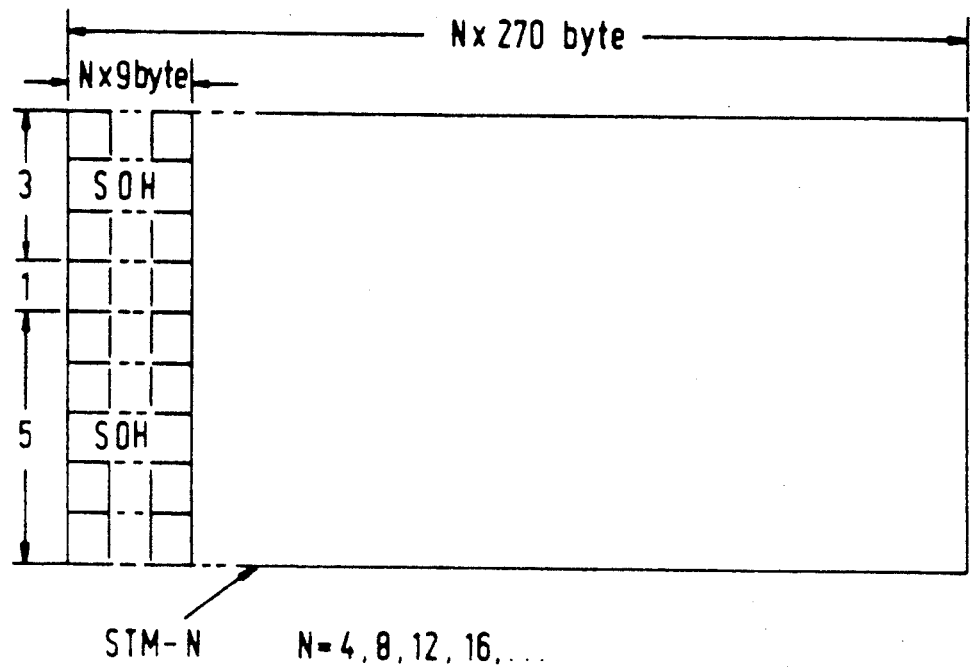
FIG. 1 shows the diagrammatic structure of a digital signal comprising STM-N frames (N=4, 8, 12, 16, ... )

The function of the circuit arrangement according to the invention will be explained, for example, with reference to the demultiplexing of an STM-16 signal into four STM-4 signals. For this purpose, FIG. 1 shows the structure of a synchronous transport module STM-N, consisting of N transport modules of the bottom hierarchy level. Digital signals of this bottom hierarchy level are transmitted at a rate of 155,520 kbit/s. The next hierarchy level is intended for the fourfold bit rate of 622,080 kbit/s and synchronous transport modules STM-4. Synchronous transport modules STM-8, STM-12 and STM-16 are possible. In these transport modules additional signals such as section overhead (SOH) and pointers etc. are contained in addition to the useful signals.

The succession in time of the individual bits within a frame is apparent from FIG. 1 when the nine rows of the Figure are cyclically passed through. Each box of the Figure is equal to 8 bits, thus one byte. The section overhead of the first row of the STM-N transport module is formed from the section overheads of the N transport modules STM-1. It comprises N * 9 bytes, as shown in FIG. 1. Subsequently, there are N * 261 bytes containing information in the first row; then comes the second row having a second section overhead which shows the same structure as the first section overhead. The same holds for the third row. The beginning of row 4 contains the so-called pointer information. After the fourth row there are five further rows containing each a section overhead at the beginning until, subsequently, the total frame is repeated.

The overheads of the transport modules render a synchronization possible e.g. of bit counters to the frames of the transport module STM-N.

Figure 2:
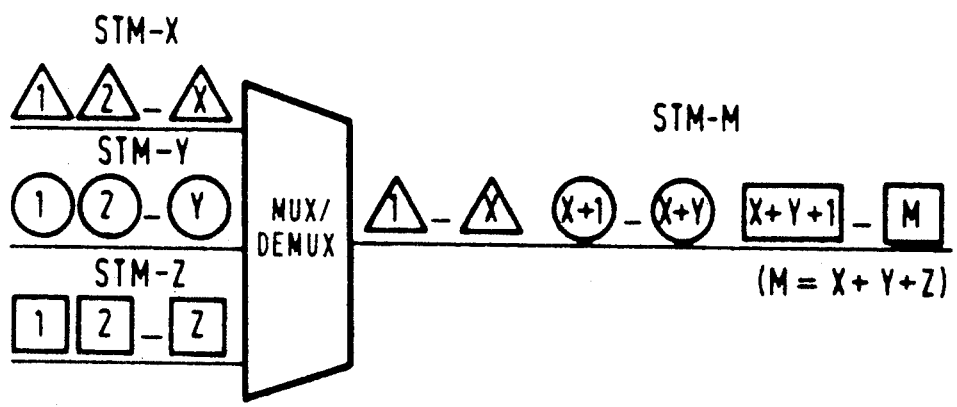
FIG. 2 shows a diagrammatic representation of the multiplex or demultiplex instruction.

FIG. 2 shows a general diagram of the way in which signals structured in transport modules are to be interleaved, so that a multiplex signal occurs having a transport module of the structure represented in FIG. 1. The depicted geometrical figures (triangles, quadrangles and circles) represent bytes of the three signals to be interleaved. The multiplex signal having the module STM-M appears from the sequence of Z bytes of the tributary signal having the module STM-Z, from Y bytes of the tributary signal having the module STM-Y and from X bytes of the tributary signal having the module STM-X, where M=X+Y+Z.

From FIG. 2 it can be recognised that in the multiplexer (not designated any further) each of the tributary signals is to be delayed by a predetermined interval with respect to any other tributary signal, in order that the prescribed structure for the multiplex signal emerges. If this delay is not effected in the multiplexer it will have to be effected at another position which will then lead to a delayed arrival of the signals STM-X, STM-Y and STM-Z at the inputs of the multiplexer. If the direction of the signal flow is reversed, FIG. 2 can also be read as a demultiplexing diagram.

Figure 3:
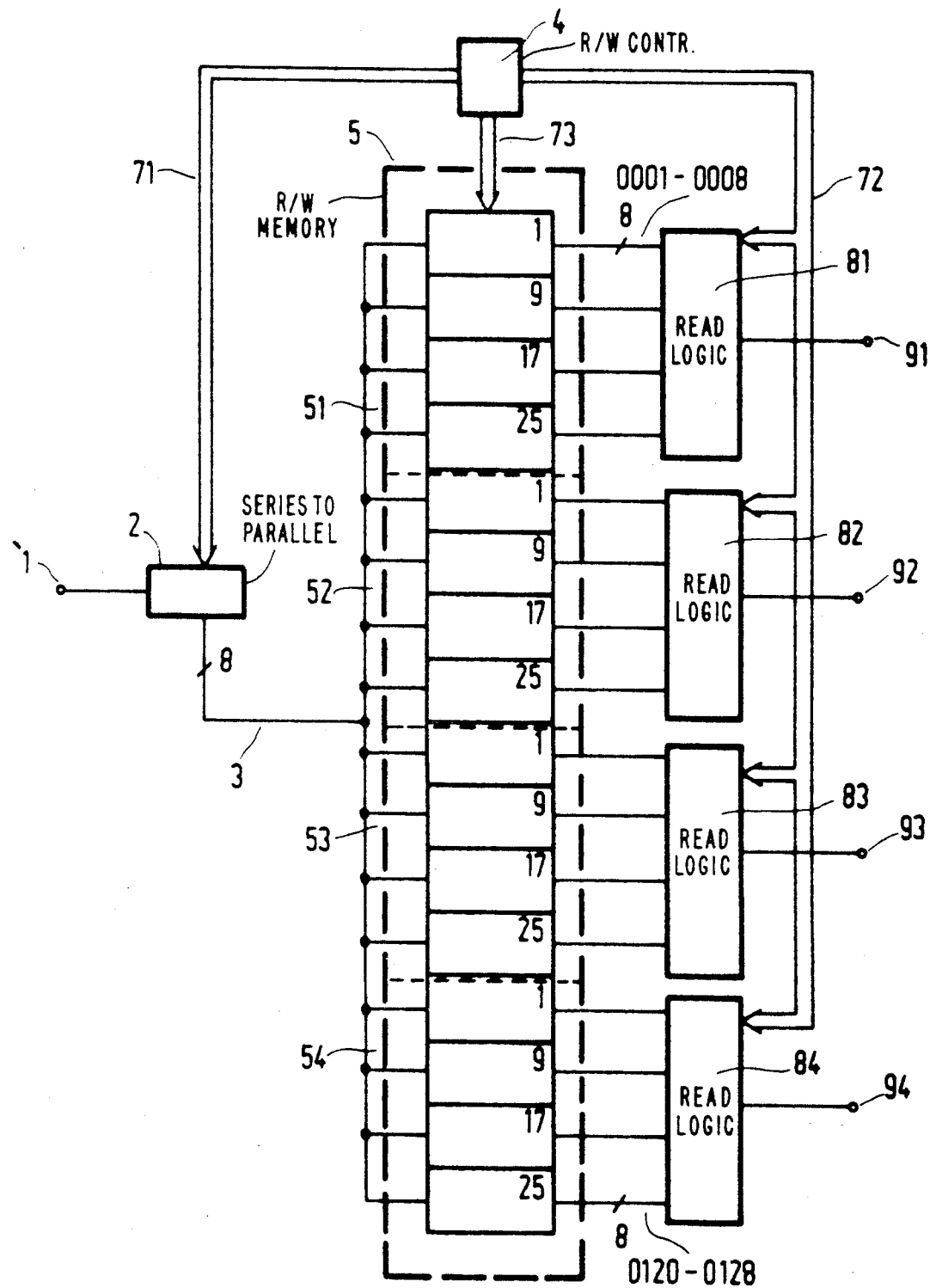
FIG. 3 shows a multiplexer and demultiplexer respectively, according to the invention.

FIG. 3 shows the circuit diagram of a multiplexer or demultiplexer respectively, according to the invention. Depending on the direction of the signal flow the circuit shown in FIG. 3 is the block diagram of a demultiplexer or a multiplexer.

First the circuit as shown in FIG. 3 is to be understood as a demultiplexer by means of which a multiplex signal structured in transport modules STM-16 is broken up into four tributary signals having transport modules STM-4. The serial multiplex signal is applied to a terminal 1 and subdivided into eight parallel bit streams by means of a serial-to-parallel converter 2. The multiplex signal is isochronous, i.e. the intervals between the individual signal elements are equidistant. The eight output lines 3 of the serial-to-parallel converter 2 are connected to the inputs of each eight consecutive memory locations of a write/read memory 5. The write/read memory has a total of 128 memory locations which are combined to four groups 51, 52, 53, 54 of 32 memory locations each.

The set of parameters (Q, K, W) left unspecified in the general part of claim 1 is thus identical with the triple number (4, 32, 8) in the present example.

A write/read control 4 provides the serial-to-parallel converter 2 with the necessary clock pulses and provides the write/read memory 4 with write/read clocks. The eight bits coming from the serial-to-parallel converter 2 are written in parallel, that is, byte-by-byte, into the write/read memory 5; the writing procedure takes place in periodic cycles with a write clock of which the frequency nominally corresponds with one eighth of the bit rate of the multiplex signal available at terminal 1.

Once the complete synchronization has been established, a first byte of a first tributary signal is written into the first eight memory locations of group 51. The numbers of the memory locations in group 51 are not fully indicated; for clarity only each eighth memory location is provided with a number. The same holds for the groups 52, 53 and 54 of memory locations. From the first tributary signal a total of four bytes are written, then four further bytes of a second tributary signal up to the last byte of the fourth tributary signal; then the writing procedure with the first eight memory locations of group 51 commences again.

The bits stored in the groups 51, 52, 53 and 54 are read out bit-by-bit over lines 0001 to 0128 and read logics 81, 82, 83 and 84, which are provided with control signals by the write/read control 4. In each group 51, 52, 53 and 54 the reading is effected cyclically. The read logic 81 e.g. connects by means of gates, one of its 32 inputs to the output 91. Which one of these inputs is connected to the output 91 and at which instant is controlled by the write/read control 4 transmitting addresses. The same holds for the read logics 82, 83, 84 and outputs 92, 93 and 94.

During the write/read process it should be borne in mind that all memory locations written into during a write cycle are also read out during a read cycle. Worded differently: The writing process is not to overtake the reading process (the writing process is the faster of the two). For example, if the first memory location (together with the next seven locations) of group 51 is written into, and the $L^{th}$ memory location is read out, L is not to assume arbitrary values between 1 and 32. For arbitrary values of Q, K and W it can be shown that L is to be equal to $1+[(K-Z) \mod K]$, where the integer Z is to fulfill the requirement $0 \leq Z \leq (K-W)/Q$, but may further be chosen freely. The term between the square brackets means the remainder of $K-Z$ after division by K. In the present example it appears that Z is allowed to pass through all values from 0 to 6 which can be verified by inserting for Z the actual magnitudes for Q, K and W in the formula. The conclusion for L is then: If the first memory location (together with the seven next locations) is written into, the reading process is to start either with the first memory location or with one of the memory locations from 27 to 32, so that the writing process does not overtake the reading process. In the present example the write/read control 4 provides that the $28^{th}$ memory location is read out when the first memory location (together with the seven next locations) is written into.

Accordingly, it can generally be shown that the frames of the signals that can be taken off at the output terminals of a demultiplexer are mutually shifted by K/Q bits. When applied to the present example this means that the frames of the signals available at the output terminals 91, 92, 93 and 94 are each time mutually shifted by one byte.

This shifting has no effect in a demultiplexer as long as the tributary signals can be transported in a mutually independent manner. However, with the interleaving of the signals—thus in a multiplexer—it does become important when the result of the interleaving is prescribed in its structure (cf. for this purpose FIG. 2).

In the sequel the circuit of FIG. 3 is understood to be a multiplexer which combines four tributary signals that have been structured in accordance with transport modules STM-4 to a single multiplex signal having an STM-16 frame.

The tributary signals are then available at the terminals 91, 92, 93 and 94 and are mutually shifted by one byte according to their order. This shift is effected by means of building blocks which will not be further discussed in this context.

The way of operation of a such multiplexer clearly appears from that of the demultiplexer when exchanging writing processes by reading processes and reading processes by writing processes and using a parallel-to-serial converter as the building block 2. The modules 81, 82, 83 and 84 are then write logics which—controlled by means of addresses of the write/read control 4—connect their inputs 91, 92, 93 or 94 to one of their outputs.

The reading process on the left side of the write/read memory 5 shown in FIG. 3 is the faster process. Therefore, the write/read control 4 is to provide that the writing process is not overtaken by the reading process. The requirements for this are the same as in the case of the demultiplexer. This specifically means for the example under discussion that only one of the memory locations 1, 27, 28, 29, 30, 31 or 32 is allowed to be written into when the first memory location (together with the seven next locations) is read out. Finally, the multiplex signal can be taken off at the terminal 1.

Both the demultiplexer and the multiplexer require in the present example a write/read memory 5 having memory locations for 16 bytes.

I claim:

1. Demultiplexer for a serial and isochronous multiplex signal consisting of Q (Q=2, 3, 4, ...) isochronous tributary signals interleaved block-by-block, each block comprising K (K=2, 3, 4, ...) bits, comprising:

series to parallel converter means for converting W serial bits (W=1, 2, 3, ...) of the multiplex signal into W parallel bits, where W is a divisor of K;

write/read memory means containing Q groups of memory locations each having K one-bit memory locations;

write/read control means for simultaneously writing bits from the series to parallel converter into W consecutive memory locations of the write/read memory and reading out the bits from the K memory locations of one of groups cyclically and for commencing the reading process at the $L^{th}$ memory location of a group when the first memory location of the group is written into, where $L=1-((K-Z)$ modulo $K)$ and the integer Z fulfills the requirement $0 \leq Z \leq (K-W)/Q$, whereby, as a result of use of L for commencing reading, the writing process does not overtake the reading process; and means for combining the bits of the read memory locations of a group to form a serial tributary signal.

2. Multiplexer for interleaving block-by-block, Q isochronous tributary signals to form an isochronous multiplex signal, each block containing K (K=2, 3, 4, ...) bits comprising:

means for distributing each K consecutive bits of one of each tributary signal over K lines;

write/read memory means containing Q groups of memory locations each having K one-bit memory locations;

write/read control means for cyclically writing the bits of a tributary signal note into the K memory locations of one of the groups and for reading out W bits of consecutive memory locations in periodic cycles; and for commencing the writing process at the $L^{th}$ memory location of a group when the first memory location of the group is read out, where $L=1+((K-Z)$ modulo K) and the integer Z fulfills the requirement $0 \leq Z \leq (K-W)/Q$, whereby, as a result of use of L for commencing writing, the write process does not overtake the read process; and parallel-to-series converter means for converting W parallel read bits (W=1, 2, 3, ...) into W serial bits of the multiplex signal where W is a divisor of K.

3. Multiplexer as claimed in claim 2, characterised in that for the case in which all tributary signals have equal frame structures, each tributary signal is delayed by K/Q bits with respect to the next tributary signal and Q is a divisor of K.

* * * * *